United States Patent [19]

Blomberg

[11] 3,738,366

[45] June 12, 1973

[54] DISPOSABLE FORCEPS

[76] Inventor: Theodore G. Blomberg, 3715 West 9th St., Winthrop Harbor, Ill. 60096

[22] Filed: July 15, 1970

[21] Appl. No.: 55,190

[52] U.S. Cl. ............................................. 128/354
[51] Int. Cl. ........................................... A61b 17/50
[58] Field of Search ....................... 128/354; 81/43

[56] References Cited
UNITED STATES PATENTS

| 902,726 | 11/1908 | Greer | 81/43 |
| 1,386,436 | 8/1921 | Smith | 128/354 X |
| 3,489,151 | 1/1970 | Eller | 128/354 X |

FOREIGN PATENTS OR APPLICATIONS

| 648,873 | 1/1951 | Great Britain | 81/43 |
| 852,440 | 10/1952 | Germany | 128/354 |

Primary Examiner—Lucie H. Laudenslager
Attorney—Petherbridge, O'Neill and Lindgren

[57] ABSTRACT

A disposable forceps constructed of a light gauge material such as metal to provide an economical instrument for use in various medical and related applications. The transverse configuration of the body of the forcep is formed with a U-shaped shape to achieve high ridigity in the instrument with the light gauge material.

5 Claims, 10 Drawing Figures

PATENTED JUN 12 1973 3,738,366
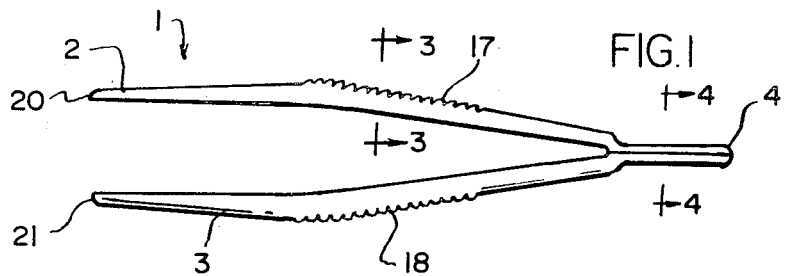
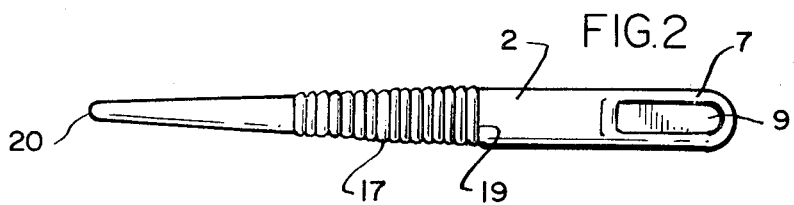
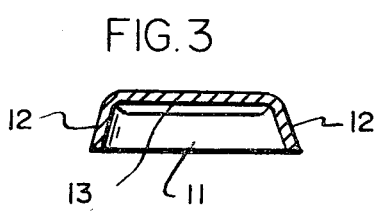
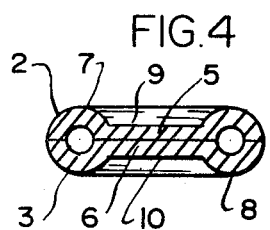
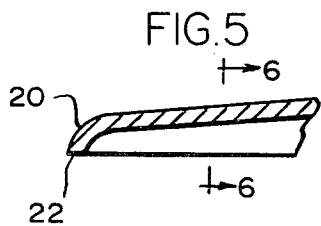
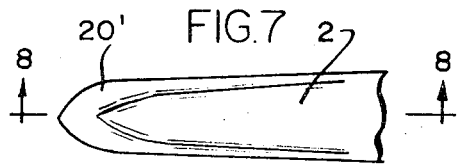
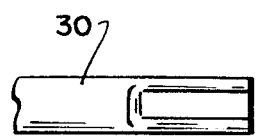
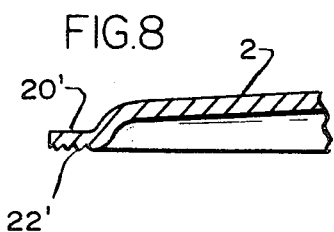
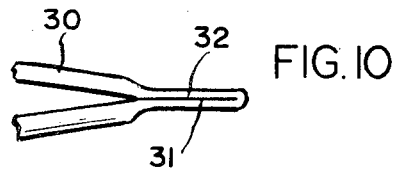
INVENTOR.
THEODORE G. BLOMBERG
BY Petherbridge, O'Neill & Lindgren
ATTORNEYS.

DISPOSABLE FORCEPS

BACKGROUND OF THE INVENTION

This invention relates in general to medical instruments and, in particular, to an improved disposable forceps.

More specifically, this invention relates to a disposable forceps which is constructed with a light gauge material such as a metal so as to be economically discarded after use and which also achieves rigidity and other operative characteristics of non-disposable prior art forceps. The body of the forcep is formed with a U-shaped configuration to provide the necessary rigidity to the instrument.

Sterile medical forceps are universally utilized instruments in hospitals, physician's offices, or other related locations and are used for a variety of functions. For example, forceps may be used to remove sutures, to handle dressings, to manipulate cut or damaged skin and tissue, and to manipulate absorbent cotton balls in swabbing a patient. Forceps are also relied upon to perform multitude of other functions and are among the most useful tools available in the medical profession.

In the past non-disposable metal forceps have been commonly utilized. Generally, such forceps are formed of a heavy gauge material which is relatively expensive; such as, stainless steel, and which after each use must be resterilized. The high cost of the non-disposable stainless steel forceps and their repeated requirement of sterilization makes inexpensive disposable forceps a desirable instrument for medical applications.

Several medical forceps have been constructed in the past as a disposable item and generally these prior art instruments were made of a flat material which was of a less expensive quality than the metal used in the reusable forceps. However, flat type forceps present several disadvantages such as the necessity of an overly thick material in the body of the instrument to insure sufficient rigidity in view of the flat shape. Alternatively, the material of the arms of the instrument were hard tempered to a degree to provide the necessary rigidity to the body. However the requirement of either a thick material or the hard tempering of the metal does not permit economical manufacture and thus an inexpensive metal forceps was not produced by such a design. The flat type metal forceps not only is uneconomical but the appearance and the feel of the flat disposable forceps was dissimilar to the instrument with which the physicians or other trained personnel were accustomed. Also, the prior art disposable item did not function in a manner necessary for an efficient forceps, and tended to be too cumbersome to achieve desired results. Therefore, it is desirable to provide a disposable forceps made of an inexpensive material, such as a light gauge metal, that achieves the functional results of standard non-disposable forceps but which at the same time is manufactured in an economical manner to allow disposability after each use.

SUMMARY OF THE INVENTION

It is, therefore, an object of this invention to improve the feel and appearance of a disposable forceps.

Another object of this invention is to construct a forceps of an inexpensive material to produce a low cost and disposable instrument.

A further object of this invention is to improve a forceps by constructing it in a form which is inexpensively and readily manufactured.

A still further object of this invention is to improve a forceps by constructing it with a body having a U-shaped transverse configuration.

These and other objects are attained in accordance with the present invention wherein there is provided an inexpensive disposable forceps which are readily manufactured. The forceps of the invention are constructed with a light gauge material such as metal and the body of the forceps is formed in a U-shaped configuration to achieve the necessary rigidity and feel of the instrument with a comparatively thin sheet of material of low cost. Further, the novel forceps herein disclosed perform in a manner comparable to the expensive conventional forceps of the permanent type. The instruments of the present invention, because of its unique and novel construction, may be manufactured in a very economical manner to provide an inexpensive instrument which may be more readily discarded after use than that provided by prior art devices. As an example of a manner in which the novel forceps disclosed herein may be manufactured, the instrument can be fabricated completely from a coiled metal as a one-piece construction on a progressive die in a punch press. The forceps of the invention also can be constructed by other suitable inexpensive manufacturing techniques.

DESCRIPTION OF THE DRAWINGS

Further objects of the invention, together with additional features contributing thereto, and advantages accruing therefrom will be apparent from the following description of several embodiments of the invention when read in conjunction with the accompanying drawings wherein:

FIG. 1 is a side elevation view of one embodiment of the disposable forceps of the invention.

FIG. 2 is a plan view of the disposable forceps of FIG. 1.

FIG. 3 is a cross section view of the forceps of FIG. 1 taken along lines 3—3 of FIG. 1.

FIG. 4 is a cross section view taken along line 4—4 of FIG. 1.

FIG. 5 is an enlarged cross section view taken longitudinally of the tip of the forceps of FIG. 1.

FIG. 6 is a cross section view taken along line 6—6 of FIG. 5.

FIG. 7 is a plan view of another embodiment of the forceps of the invention.

FIG. 8 is a cross section view taken along line 8—8 of FIG. 7.

FIG. 9 is a plan view of the hinge portion of still another embodiment of the forceps of the invention.

FIG. 10 is a side view of the embodiment of FIG. 9.

DESCRIPTION OF THE PREFERRED EMBODIMENTS

Referring now to FIGS. 1 and 2 there is shown one embodiment of the disposable forceps according to the present invention. The forceps 1 of FIGS. 1 and 2 comprise a two-part structure suitably formed to provide the improved results of the invention. The top member 2 of the forceps is identical in construction as the bottom member 3 and the two members are affixed together in contact with each other for a desired extent to create the novel forceps herein disclosed. The ends of each member 2 and 3 at end 4 of the instrument are attached in a manner so the affixed portions of the members 2 and 3 appear as an unitary body.

Referring now to FIG. 4, the cross section of the portion of the two members which are coupled together at the end 4 is illustrated. Each of the members 2 and 3 have an indented bearing surface 5 and 6, respectively, which is formed by a suitable pressing technique to create the surface on one member which contacts with the identical surface of the adjacent member of the device. The bordering portion of the ends of each member 2 and 3 have a resulting raised curved portion 7 and 8 which extends around the indented surfaces to form indentations 9 and 10 on each side of the outer surface of both members 2 and 3.

The indented bearing surface 5 and 6 are bonded together in any conventional manner such as, for example, spot welding, or other type bonding agent. It should be apparent from the foregoing that the indentations 9 and 10 created by a conventional pressing method produces not only the bearing surfaces 5 and 6 to adequately secure the two pieces together but also provides an indentation on both sides of the outer surface which acts as a convenient method of picking up and otherwise manually holding the forceps. Referring again to FIG. 1, it can be seen that at a point just beyond the bearing surfaces 5 and 6, the members 2 and 3 of the instrument diverge outwardly from each at a selected angle in the intermediate portion of the forceps. The angle selected may be any of any magnitude which produces the desired resilience in the instrument to bias the two arms in opposite directions from each other.

Referring to FIG. 3, the cross sectional shape of the diverging portions of member 2 is illustrated wherein member 3 possesses an identical transverse shape. The member 2 is constructed with a U-shaped cross section whereby the open portion 11 of the U-shape confronts the opposite similarly constructed open portion of member 3. The edge portion 12 of the member 2 is illustrated as extending at an angle which is not exactly perpendicular to the plane of the central portion 13 of the body, but it is within the scope of the present invention to construct the edges to be directed in other planes other than as illustrated in FIG. 3 including perpendicular to the plane of central portion 13. From the foregoing, it should be apparent that the U-shaped construction of the member 2 and 3 provides rigidity in the body of the forceps which allows the instrument to be constructed of a low gauge material such as a metal or other suitable materials.

At an intermediate longitudinal position along the outer surface of each member 2 and 3, roughened surfaces 17 and 18, respectively, are provided to insure positive manual manipulation of the forceps. The surfaces 17 and 18 are shown to be serrated in form in FIG. 1 but other well known alternative forms roughing the outside surface to effect secure grasping of the instrument may be utilized in connection with the invention. At a location 19 approximately equal to where the roughened surface of the instrument begins with respect to end 4, the members 2 and 3 are longitudinally tapered in a uniform manner in height and width.

The portion of the members 2 and 3, as shown in FIG. 1, which extends from adjacent the roughened surfaces 17 and 18 to tip portion 20 and 21, are substantially parallel to each other as compared to the diverging extent of the intermediate portion of the members. The forceps are manually grasped at roughened surfaces 17 and 18 by the user of the instrument to press the two members 2 and 3 together wherein tips 20 and 21 contact each other or a material being manipulated by the instrument.

In viewing FIGS. 5 and 6 the tip portion of the forceps when in a closed position is illustrated in a sectional view. The tip 20 of top member 2 includes a bent down end having a surface 22 which bears in pressure contact with a similar surface at the tip of member 3 when in a closed position. The respective surfaces are utilized to manipulate or otherwise handle whatever material is being contacted therebetween. FIG. 6 illustrates that the tip portion has a substantial U-shape in cross section similar to the intermediate portions of the members 2 and 3 although the shape is somewhat more rounded in construction.

Referring now to FIGS. 7 and 8 there is shown another embodiment of the improved forceps of the invention. The body adjoining the two pieces of the forceps is identical to that described with reference to FIGS. 1 and 2. However, the structure at the tip 20' of the embodiment of FIGS. 7 and 8 is modified to provide a greater tip surface 22' at the tip for uses where such a surface is desired. The tip 20' is formed by press forming the end of the member to provide a curvature into a flat end surface 22' which may be serrated or otherwise roughened to come into operational proximity with the similar surface of the member 3 and thus provide a greater frictional contacting area.

Referring now to FIGS. 9 and 10 there is shown still another embodiment of the improved forceps according to the invention. The embodiment in FIGS. 9 and 10 is identical to that shown in FIGS. 1 and 2 except that the forceps are formed by a one-piece construction rather than the two pieces previously described. Such a construction is formed by bending the body of a one-piece member 30 in such a manner that at a point in the middle of the piece the length of the member is bent to create two arms. A suitable pressing technique or the like presses each end to create two abutting surfaces 31 and 32 such as shown in reference to FIG. 4 of the embodiment of FIG. 1. The two contacting surfaces 31 and 32 are pressed to form respective flat surfaces which are as a result of the one-piece construction, affixed to each other such as by solder or other adhesive agents. The rest of the instrument is identical in construction as that described in reference to FIGS. 1 and 2. It should be apparent, however, that the form of the tip 20 may also be constructed in a manner described in the reference to the embodiment of FIG. 8 if desired.

In the above description, there has been disclosed an improved disposable forceps for use in medical and other related field. The forceps is constructed in such a manner that a U-shaped body portion provides necessary rigidity and feel to the instrument with low gauge metal or other suitable inexpensive material. Such a construction renders the instrument readily disposability after each use since the construction of the forceps of the invention can be achieved by a low cost manufacturing technique.

While the invention has been described with reference to preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A disposable forceps comprising two arms having at one end respective complimentary end portions affixed together, said complimentary portion includes a flat end surface adapted to contact each other, said affixed end portions forming a pair of longitudinally extending cavities, said pair of cavities separated from each other by said flat surface, said opposite ends having a respective tip surfaces adapted to be placed in operative bearing contact with each other upon the application of manual pressure to said arms, and each of said arms having a substantially U-shaped cross-sectional configuration to provide a predetermined rigidity to said arms.

2. The forceps of claim 1 wherein said two arms are two separate elongated members having respective complimentary end portions bonded together.

3. The forceps of claim 1 wherein said two arms comprise a single elongated member bent back and including said two complimentary portions in bonded contact with each other.

4. The forceps of claim 1 wherein said tip surfaces are roughed.

5. The forceps of claim 1 wherein said arms include a roughened outer surface to provide a manual pressure applying area on the arms.

* * * * *